United States Patent [19]

Strauff

[11] 3,841,653
[45] Oct. 15, 1974

[54] STABILIZATION MEANS FOR MOTOR VEHICLES

[75] Inventor: Günther Strauff, Kaarst, Germany

[73] Assignee: Langen & Co., Dusseldorf, Germany

[22] Filed: June 15, 1972

[21] Appl. No.: 263,098

[30] Foreign Application Priority Data
June 16, 1971 Germany............................ 2129846

[52] U.S. Cl.......................... 280/124 F, 180/79.2 R
[51] Int. Cl............................................. B60g 21/06
[58] Field of Search ............ 280/124 F, 124 R, 111, 280/112 A, 6 H; 180/79.2 R

[56] References Cited
UNITED STATES PATENTS

| | | | |
|---|---|---|---|
| 3,085,645 | 4/1963 | Bookout et al. | 180/79.2 R |
| 3,240,285 | 3/1966 | Williamson | 180/79.2 R |
| 3,399,905 | 9/1968 | Vogel | 180/79.2 R |
| 3,563,330 | 2/1971 | Strauff | 180/79.2 R |

*Primary Examiner*—Philip Goodman
*Assistant Examiner*—John A. Carroll
*Attorney, Agent, or Firm*—Holman & Stern

[57] ABSTRACT
Stabilization means for motor vehicles provided with a pneumatic or hydro-pneumatic suspension system and a level-regulating device which, depending upon the distance between the wheel supports and the vehicle body, in a first control position supplies pressure medium from a pressure source into the working space of one or a plurality of resilient elements mounted between the wheel supports and the vehicle body, and in a second control position, removes the pressure medium from the working space while in a third control position which is in accordance with the level position, blocks the working space, together with a hydraulic servo-steering device with a pressure source, a control valve and a servo-motor so that a change-over valve having an influencing effect on the level-regulating device is activated during operation of the steering device, in which the change-over valve is series-connected with the level-regulating device suchwise that in a first position in accordance with driving along straight ways, the level-regulating device functions normally, while in a second position during driving along curving or winding roads, the effect of the level-regulating device is suspended, whereby the switching of the change-over valve from the first position into the second position is effected hydraulically with the assistance of the pressure-difference or the pressure-increase which develops within the servo-steering device during driving on curving or winding roads.

9 Claims, 6 Drawing Figures

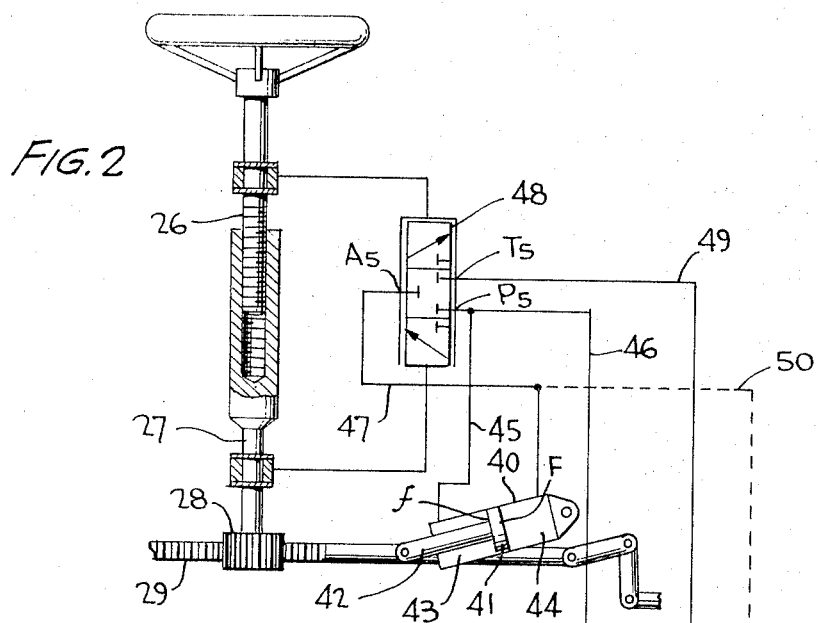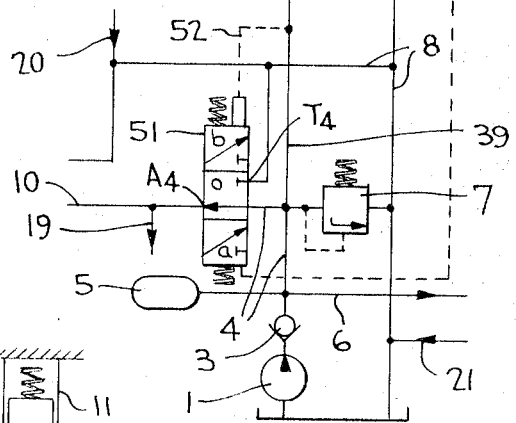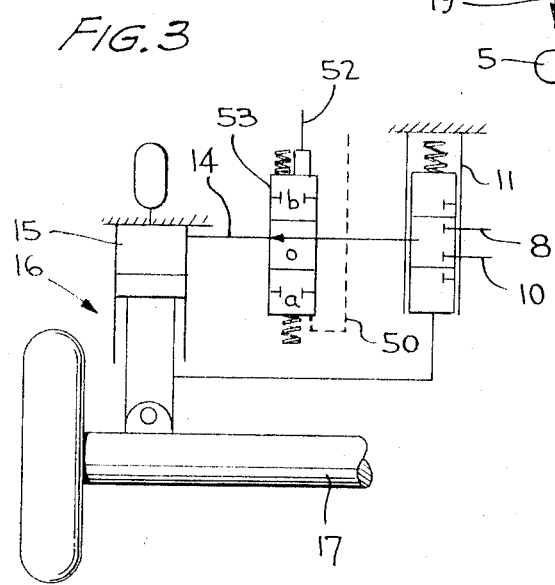

STABILIZATION MEANS FOR MOTOR VEHICLES

BACKGROUND OF THE INVENTION

The present invention relates to a stabilization means for motor vehicles equipped with pneumatic or hydropneumatic suspensions and an equalization device which, depending upon the distance between the wheel supports and the vehicle body, supplies pressure medium from a pressure source during a first control position into the working space of one or a plurality of resilient elements mounted between the wheel supports and the vehicle body, while, when in a second control position removes the pressure medium from the working space and in a third control position, in accordance with the level position, blocks the working space; as well as a hydraulic servo-control device provided with a pressure source, a control valve and a servo-motor whereby a change-over valve which affects the equalization regulation, is actuated during the steering.

PRIOR ART

A similar stabilization device is disclosed in German Pat. No. 1,173,353 and this patent illustrates a switchover regulating valve which functions to supply air to the additional resilient elements which are outside the curve during driving on curving or winding roads, and to remove the air when the vehicle again moves along a straight section of road. The activation of the change-over valve is caused by friction contact over an activating rod driven by the steering-wheel shaft or spindle. Such an arrangement does not provide stabilization means with the aid of the actual resilient elements, but, is a stabilization by means of additional resilient elements.

Since the level-regulating valves should function fully also during travel on curving or winding roads, air is being supplied into the resilient elements located outside the curve while air is being removed from the resilient elements located inside the curve. During sudden changes in the direction of driving, for example, in driving along S-curves, the previously heavily filled resilient elements outside of the curve changes into the inside curve and vice versa with the result being an increased, undesired tilting of the vehicle body.

It is therefore a salient object of this invention to overcome such disadvantages and to provide a stabilization device which is so constructed that a normal tilting angle of the vehicle body is not exceeded. The use of pressure means should be reduced and finally a simple and more economical arrangement should be provided to operate the change-over valve depending upon the steering movements. It should further be possible to install the change-over valve at a distance from the steering shaft or spindle at any desired position within the vehicle.

SUMMARY OF THE INVENTION

This problem is solved by the present invention in that the change-over valve is series-connected with at least one level-regulating device, so that in a first position which is in accordance with driving along straight sections, the level-regulating device functions normally, while in a second position in accordance with driving along curving or winding roads, the effect of the equalization regulating device is deactivated, whereby the switching of the change-over valve from the first into the second position is caused hydraulically via the assistance of the pressure-difference or the developing pressure-increase occurring during driving on curving roads within the servo-steering device.

In a servo-steering device having a "closed-center valve" construction, the pressure difference for switching between the control-valve and servo-motor is tapped whereby the change-over valve may be pressure- or spring-centered. In a servo-steering device having a "open-center valve" construction, however, the pressure can be tapped in front of the control-valve, whereby the change-over valve can be spring-centered.

In a steering device with a so called "dual-edge steering," a change-over valve with a pressure or a spring-centered differential piston is suitably utilized.

Depending upon the mounting position, a plurality of possibilities result for the change-over valve, with such possibilities being determined partially by the structural details of the level-regulating devices. If, for example, a check valve is series-connected to a level-regulating valve, then the change-over valve should be installed in the pressure line in front of the level-regulating valve so that the branching-off point of the control-mechanism of the releasable check-valve is positioned between the change-over valve and the level-regulating valve. In level-regulating devices without a releasable check-valve, the mounting of the change-over valve is most suitably effected between the level-regulating valve and the working space. In this case, it is also possible to separate two resilient elements with adjoining working spaces and only one level-regulating valve, the same being mounted on different sides of the vehicle body, by positioning the change-over valve into the connection pipe between the working spaces. Basically, it is possible in all of these set ups to eliminate simply the supplying of the pressure medium or, to permit a pressureless release of pressure medium.

The advantage of this invention resides particularly in its simple and multiple possibilities of use thus making the device suitable for hydraulic servo-steering devices and for pneumatic or hydro-pneumatic suspensions provided with level-regulators. Since the change-over valves may be of a very simple and space saving design, and since only pipes or tubes with small diameters are required, a stabilization without a change in the resilient suspension for steering can be realized. In fact, even a later installation is possible without any problems or difficulties.

This invention is equally suitable for resilient suspensions equipped with inside positioned level-devices such as for suspensions having separately mounted balance-regulating devices.

Further objects and advantages of the invention will become more readily apparent to persons skilled in the art from the following detailed description and annexed drawings, and in which drawings:

BRIEF DESCRIPTION OF THE DRAWINGS

FIG. 2 is a diagrammatic view illustrating a control valve of the "closed center" type in a triple-path arrangement with the level regulation being maintained open, FIG. 3 is a diagrammatic view illustrating a level-regulating valve without a series-connected releasable check valve, in which the servo-steering can function similar to that illustrated in FIG. 1.

DETAILED DESCRIPTION OF THE DRAWINGS

Figure 1:
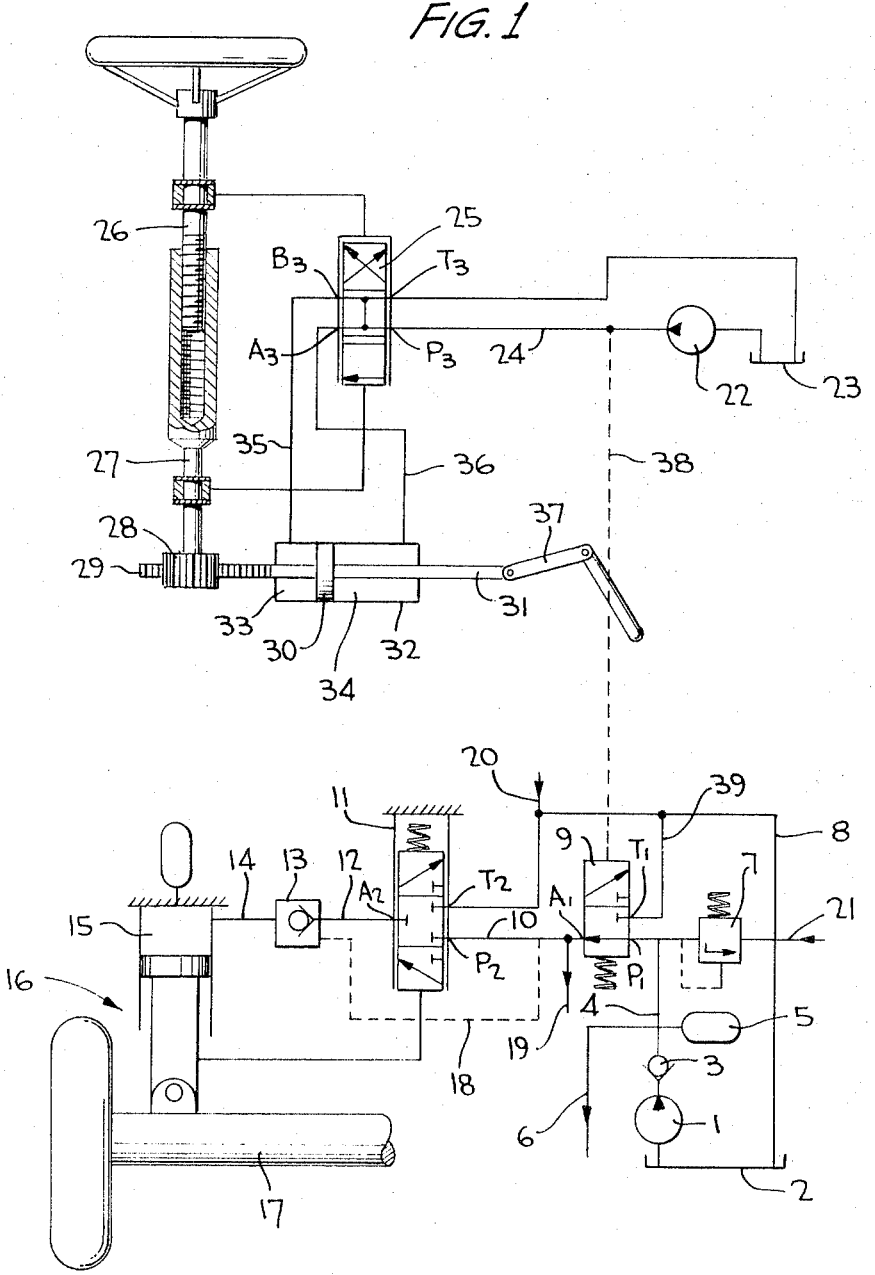
FIG. 1 is a diagrammatic view illustrating a switching arrangement provided with a control valve of the "open-center" type and a level-regulation with a releasable check valve.

In FIG. 1, it will be noted that a pump 1 removes a pressure medium (fluid) from a storage container or vessel 2 and moves the fluid via a check-valve 3 into a pipe or line 4. A pressure storage vessel 5 is connected to the pipe 4 as well as a pipe or line 6 leading to additional utilizers.

A pressure control valve 7 is located between the pipe 4 and a drain line or conduit 8. The pipe 4 leads to a connection P1 of a change-over valve 9. In the starting position O, the connection P1 is connected with a connection A1 from which a pipe or line 10 leads to a connection P2 of a level-regulating valve 11. In the position O, the connection P2 is connected with a connection A2 which, in a second control position $b$ is connected with a connection T2 to which the drain line 8 is connected. In a third control position $o$, the connections A2, P2, T2 are blocked from each other.

A pipe or line 12 leads from the connection A2 to a releasable check-valve 13 from which a pipe or line 14 leads to a working space 15 of a shock absorber leg or strut 16 which operates between a wheel support 17 and a vehicle body, the vehicle not being illustrated in detail.

A control pipe 18 branches from the pipe 10 to the check-valve 13 and a pipe or line 19 can lead from the pipe 10 to additional level-regulating valves whose outlet line 20 terminates at the drain line 8. In the same fashion, an outlet pipe 21 of additional utilizers (not illustrated) leads into the drain line 8. A second pump 22 removes fluid from a storage container 23 and moves the fluid via a pipe or line 24 to a connection P3 of a control valve 25, the valve 25 being provided with three possible switch positions. In a first position $a'$, the connection P3 is connected with a connection A3 and a connection B3 is connected with a connection T3. In a second position $b'$, the connection P3 is connected with the connection B3 and connection A3 is connected with the connection T3. In the central position $o'$, all connections A3, B3, P3, T3 are connected with each other.

The actuation of the control valve 25 is effected by means of a relative movement between two sections 26 and 27 of a divided steering wheel shaft or spindle. The activating of the relative movement may, for instance, be caused via a coarse thread and transmitted to the control valve 25 by means of control sleeves. However, from literature and practice, are known numerous other possibilities for producing such relative movements as well as in the type of placing or positioning of the same. It is also known to produce such reaction forces hydraulically or with the aid of mechanical springs. Naturally, the present invention is suitable for all of these embodiments.

A pinion 28 is connected with the spindle part 27 and the pinion meshes with a toothed rack 29 which is part of a piston rod 31 carrying a piston 30 movable in a cylinder 32. The piston 30 divides the interior of the cylinder into two working spaces 33 and 34, with the space 33 being connected with the connection B3 via a pipe or line 35, while the space 34 is connected with the connection A3 via pipe or line 36. The piston rod 31 operates guide or steering rods 37 and a control pipe or line 38 branches from the pipe 24 to the change-over valve 9.

When the steering is activated so that the control valve 25, for example, is moved into the position $a$, then a pressure increase develops in the line 24 which affects the working space 34 via connections P3 and A3, and the pipe 36 and causes a displacement of the piston 30 towards the left in FIG. 1. The pressure increase also affects the change-over valve 9 via the control line 38 and moves the change-over valve, against the force of its release spring, into the switch position $a$. In this fashion, the connection A1 is connected with the connection T1 and the pipe system defined by components 10, 18, 19 can empty itself by way of components A1, T1, 30 into the drain pipe or line 8.

Due to the now presureless control line 18, the releasable check valve 13 closes so that the operating space 15 of the leg or strut 16 is hermatically blocked. Since the connection P1 of the valve 9 is blocked simultaneously, it is impossible for fluid to flow either from or to the space 15 independent of the position of the level-regulating valve 11. Hence, no level-regulation develops and the identical conditions result in general when the control valve 25 is moved into the position $b$. During the return movement into position O, the line 24 and control pipe 38 become pressureless or substantially pressureless so that the change-over valve 9 is switched back into the position $o$. This will again pressurize the line 10 and the control line 18, with the check valve 13 being released and a level-regulation is again possible.

In the embodiment of FIG. 2, a differential-cylinder 40 is provided for realizing a servo-force with piston 41 thereof being connected with a piston rod 42 with the arrangement providing working spaces 43 and 44. A smaller functional area f of the piston 41 is located in the working space 43 while larger functional area F is located in the working space 44. The working space 43 is always connected with the line 4 by means of pipes 45 and 46 whereas the working space 44 is connected with a connection A5 of a control valve 48 via a line 47. The valve 48 is provided with two additional connections P5 and T5 with the pipe 46 being connected to the connection P5 and the connection T5 is connected with the drain pipe 8 by way of an outlet pipe 49. It will be seen that the control valve 48 is provided with three switch positions, namely positions $a$, $b$, and O. The position $a$ provides the connection P5 – A5, the position $b$, the connection A5 – T5, with all connections being blocked in position O. A control pipe or line 50 branches from the pipe 47 and leads to the largest effective area of a change-over valve 51 which is provided with a differential piston. A control pipe 52 branches from the pipe 46 towards the smaller effective area of the valve 51. The valve 51 is provided with three switch positions $a''$, $b''$ and $O''$. In the position $O''$ there is provided a connection P4 – A4 and in positions $a''$ and $b''$, a connection A4 – T4, so that the connection A4 is connected with the pipe 10, the connection T4 with the pipe 39 and the connection P4 with the pipe or line 4.

In situations in which the control valve 48 is in the position $O''$ for traveling along straight sections of road, the connections A5, P5 and T5 are blocked but the working space 43 is constantly under pressure so there develops a reaction pressure also in the working space 44 and in the pipe 47, with the reaction pressure being half as high as the system pressure at an area ratio of $F:f = 2:1$. If the effective areas of the change-over valve 51 behave in a similar manner, then the position $O''$ which is obtained by spring- or pressure-centering is thus realized. When the control valve 48 is moved into the position $a$, a pressure increase develops in the system defined by components A5, 47, 44, 50 thus resulting in a switching of the valve 51 into the position $a$ in addition to a movement of the piston 41 towards the left. In this manner, as previously described, the release of the check valve 13 is suspended and the level-regulation is placed out of operation. If, however, the control valve is switched into the position $b$, this will then result in a pressure reduction in the system defined by components 47, 44, 50. The result thereof is a displacement of the piston 41 to the right and a movement of the change-over valve into the switch position $b$ in which the connection A4 – T4 is again made.

Figure 4:
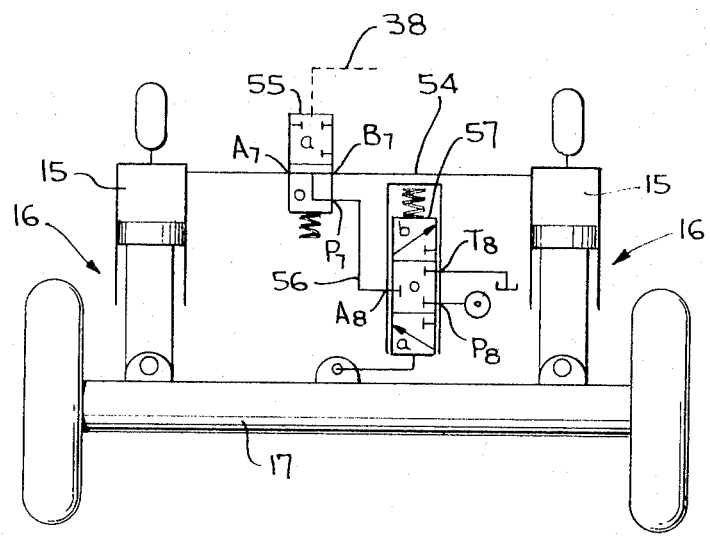
FIG. 4 is a diagrammatic view illustrating two resilient elements for a motor vehicle axle provided with a connection rod between the working spaces as well as a level-regulating valve which is actuated from the center of the axle.

According to FIG. 4, two shock absrober legs or struts 16 and 16' are located at the left and right on an axle 17, with their working spaces 15 and 15' being connected via a pipe or line 54. A change-over valve 55 is associated with the pipe 54 and such valve in its starting position O, provided by means of a spring, connects the connections A7 and B7 for the pipe 54 with a connection P7 for a pipe 56 which leads to a connection A8 of a level-regulating valve 57. The valve 57 is provided with two additional connections T8 and P8 as well as three switching positions $a$, $b$, and O, with the same having the same function as the valve 11 of FIG. 1.

In position $a$, the connections A7, B7 and P7 are separated from each other while the switching into position $a$ is caused by means of a control pipe 38 in the same fashion as described in connection with the change-over valve 9. The separation of the connections A7 and B7 especially prevents an overflow of fluid between the working spaces 15 and 15' during driving along curving or winding roads and prevents the tilting of the vehicle body connected therewith. Since at the same time the connection P7 is also blocked, fluid is thus not supplied or removed to one side.

Figure 5:
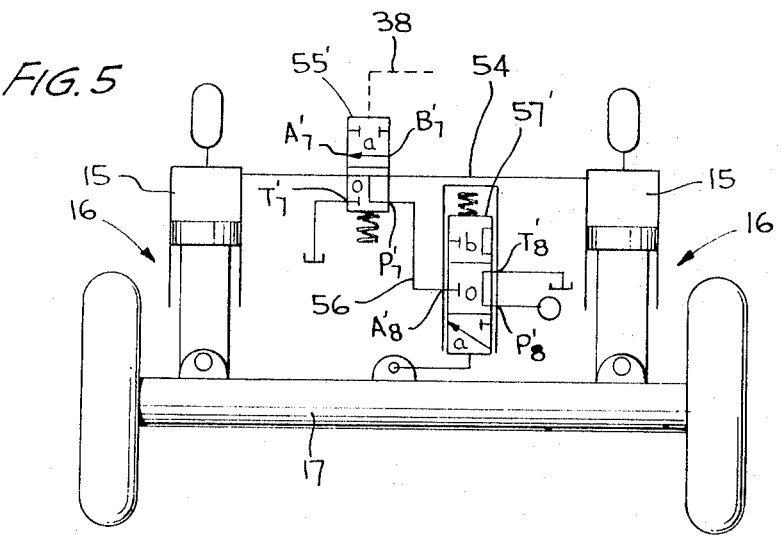
FIG. 5 is a diagrammatic view similar to FIG. 4 provided with a level-regulating valve switched to a pressureless cycle in the level position.
Figure 6:
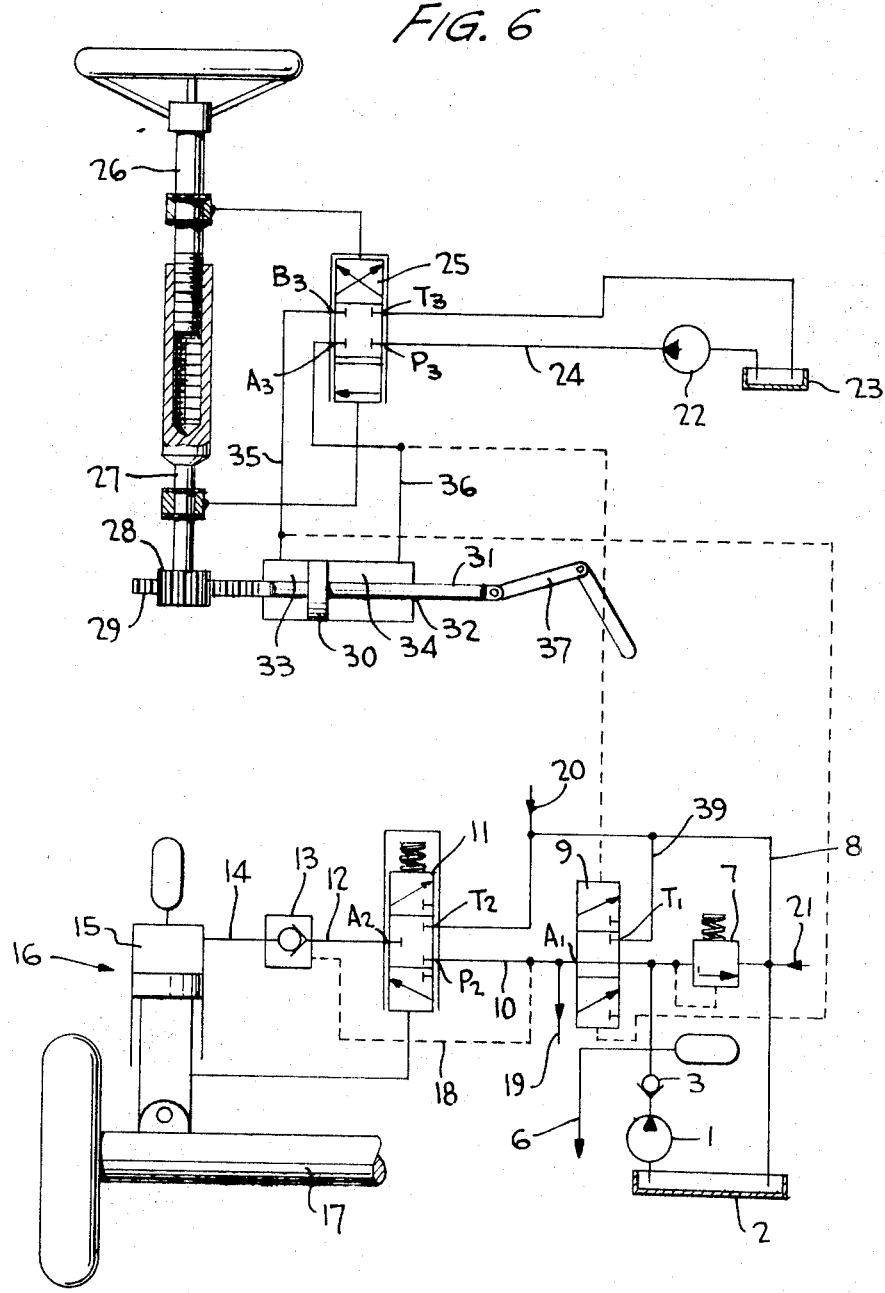
FIG. 6 is a diagrammatic view illustrating a control valve of closed-center type and in which the pressure variation developed during steering in pipes between the control valve and a cylinder is utilized for switching of the change-over valve.

In FIG. 5 there is shown a level-regulating valve 57' which, in its positions O and $b$, is provided with a connection P8' – T8' for obtaining a pressureless cycle. To be able to retain a pressureless cycle when the change-over valve 55' is switched, it is provided in its position $a$ with a connection between connections P7' and T7' whereby the connection T7' is connected with a drain pipe to the supply container.

It is to be understood that even though the description is predicated on hydro-pneumatic shock absorber legs or struts, the invention may be utilized for pneumatic springs. The construction of the change-over valve per se may be selectively chosen but it is advantageous to select a sleeve-valve construction. It should also be noted that the invention is suitable for shock absorber legs or struts having inner positioned level-regulating devices. Finally, the change-over valves may be constructed so that the pressure medium cycles in a pressureless manner after a switching process. Such a possibility is, however, only recommended when neither further utilizers nor a central pressure reservoir is available.

What is claimed is:

1. A stabilization device for motor vehicles provided with a hydro-pneumatic suspension system and a level-regulating device which, depending on the distance between wheel supports and a vehicle body, in a first control position supplies pressure medium from a pressure source into a working space of at least one resilient element mounted between the wheel supports and the vehicle body, and in a second control position, removes pressure medium from the working space, while in a third control position which is in accordance with the level position, blocks the working space, a hydraulic servo-steering device provided with a pressure source, a control valve and a servo-motor whereby a change-over valve with an influencing effect on the level-regulation is activated during operation of the steering device, the improvement comprising said change-over valve being series-connected with the level-regulating device so that in a first position in accordance with driving along straight roads, the level-regulating device functions normally while in a second position during driving along curving or winding roads, the effect of the level-regulating device is suspended whereby the switching of the change-over valve from the first into the second position is effected hydraulically via the assistance of the pressure-difference or the pressure-increase which develops within the servo-steering device during driving on curving or winding roads.

2. The stabilization device as claimed in claim 1 including a releasable check valve series-connected to the level-regulating device, in which the change-over valve is located in front of the level-regulating device and a control line branches between the change-over valve and the level-regulating device toward the releasable check valve, whereby the change-over valve in its second position separates the level-regulating device from a pressure source and connects the level-regulating device with a drain line.

3. The stabilization device as claimed in claim 1 in which the change-over valve is mounted between the level-regulating device and the resilient element, and in its first position has free passage while in its second position blocks at least the spring element.

4. The stabilization device as claimed in claim 1 in which the change-over valve is installed in a connecting line between working spaces of two resilient elements and in a first position has free passage while in a second position the passage is blocked.

5. The stabilization device as claimed in claim 4 in which a pipe from a level-regulating valve within the change-over valve in the latter's first position terminates in the connection pipe between the working spaces of two resilient elements and is blocked in the second position.

6. The stabilization device as claimed in claim 1 in which the control valve is of open-center type, the pressure-increase in a line between the control valve and a pump for the pressure medium being utilized for switching the change-over valve against the action of a spring.

7. The stabilization device as claimed in claim 1 in which the control valve is of closed-center type and is provided with steering control, the pressure variation developing during steering in pipes between the control-valve and a cylinder, being utilized for switching of the change-over valve.

8. The stabilization device as claimed in claim 1 in which the control valve is provided with triangular steering and a differential cylinder, the change-over valve having a control piston, the effective areas of which function similar to the areas of the differential cylinder so that the smaller areas are always loaded by the pressure before the control valve and the larger area is always loaded by the pressure after the control valve.

9. The stabilization device as claimed in claim 8 in which the pressure medium deriving from the pressure source is diverted either pressureless or substantially pressureless when the change-over valve is interpolated.

* * * * *